April 29, 1947.  W. B. BRONANDER  2,419,531
MULTIPLE OPPOSED PISTON ENGINE
Filed Jan. 23, 1945  3 Sheets-Sheet 1
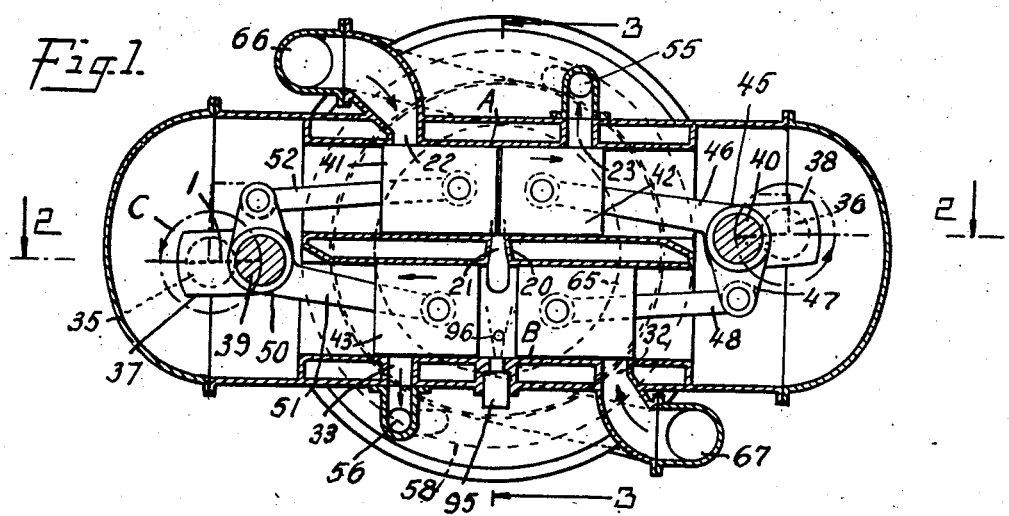
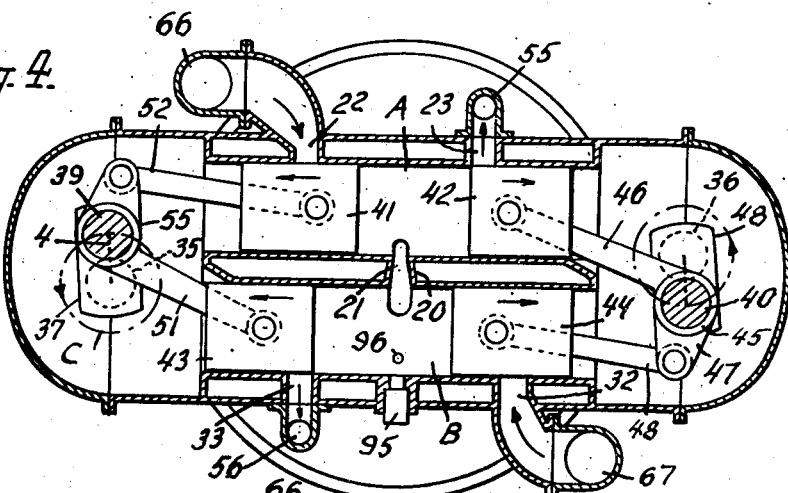
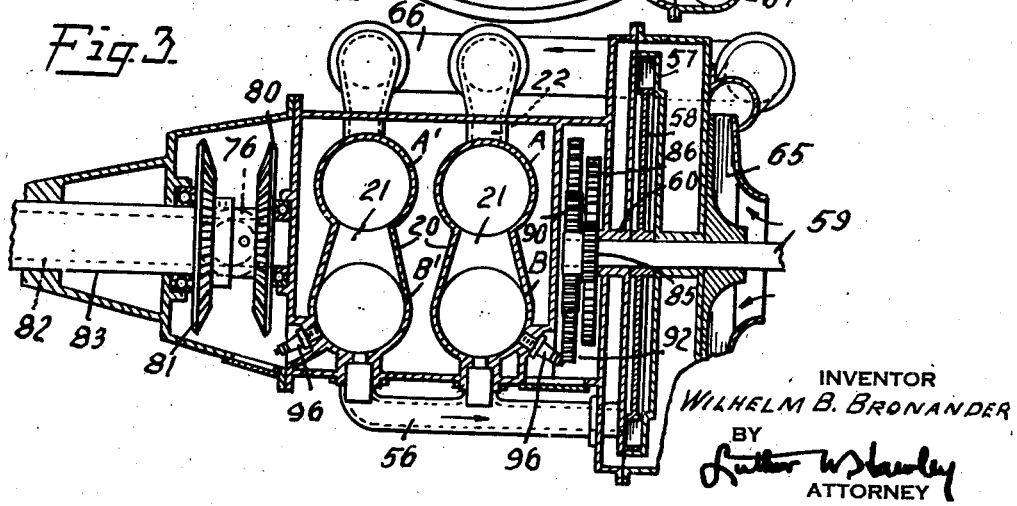
INVENTOR
WILHELM B. BRONANDER
BY
ATTORNEY

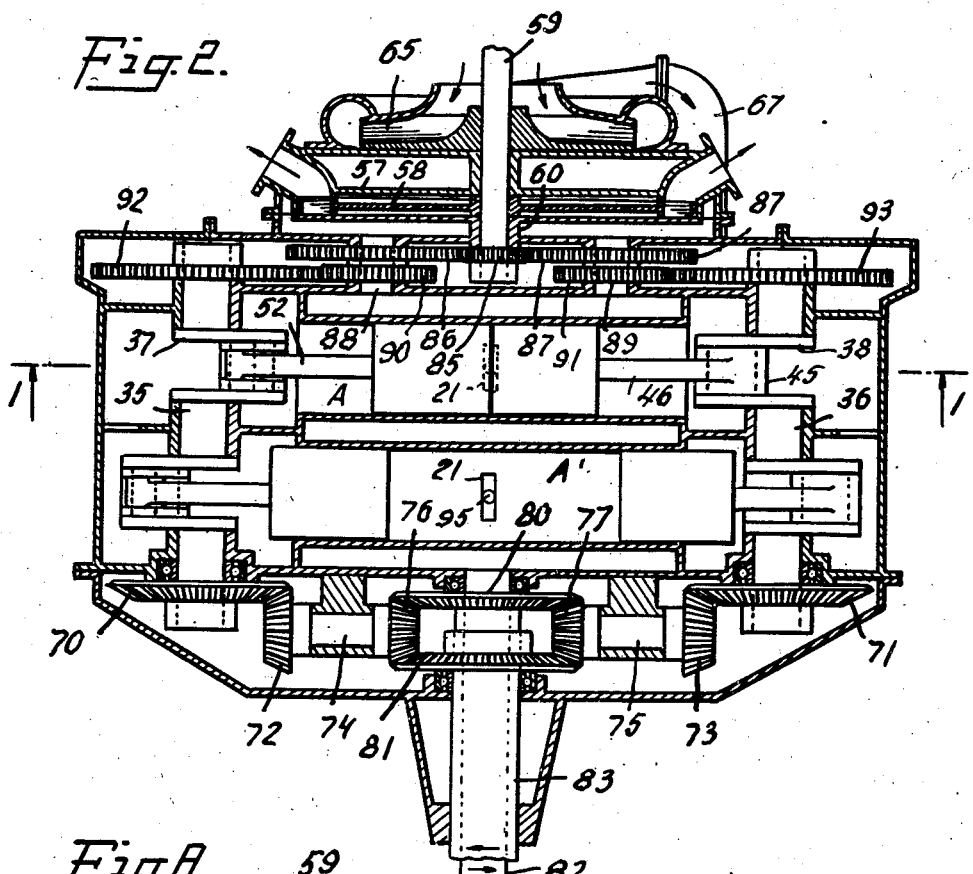
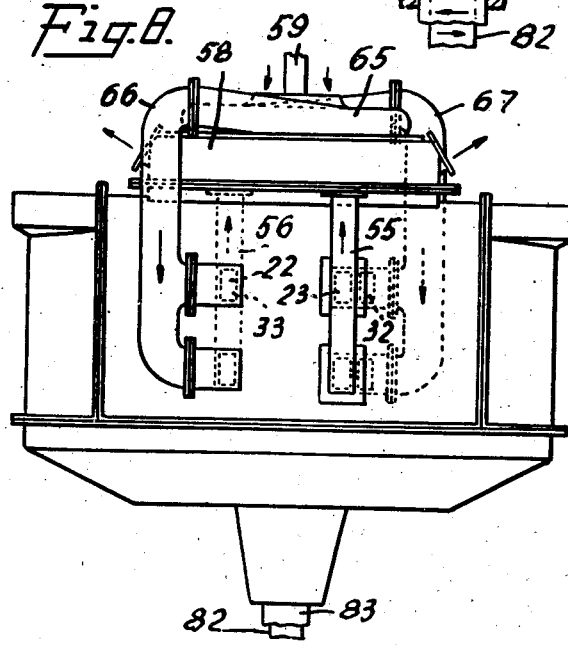
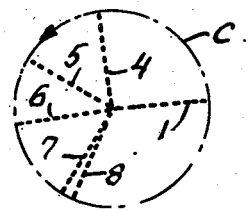

April 29, 1947.　　　W. B. BRONANDER　　　2,419,531
MULTIPLE OPPOSED PISTON ENGINE
Filed Jan. 23, 1945　　　3 Sheets-Sheet 3
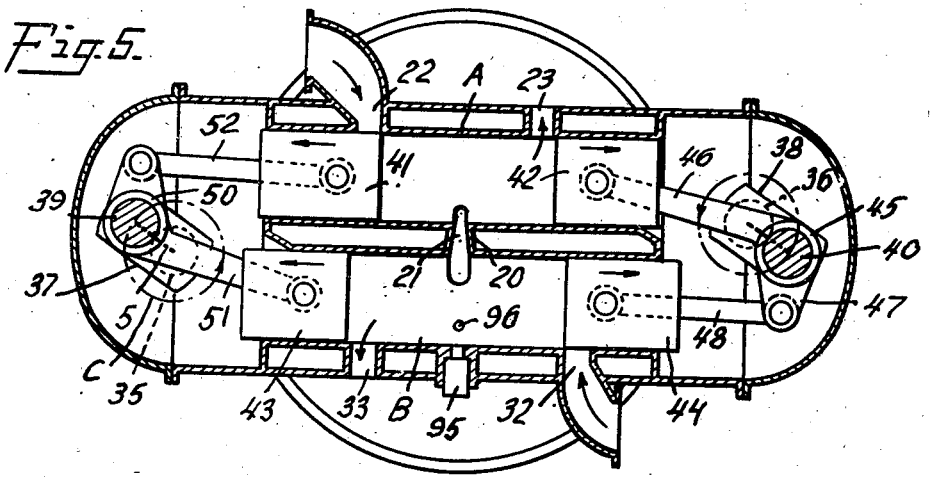
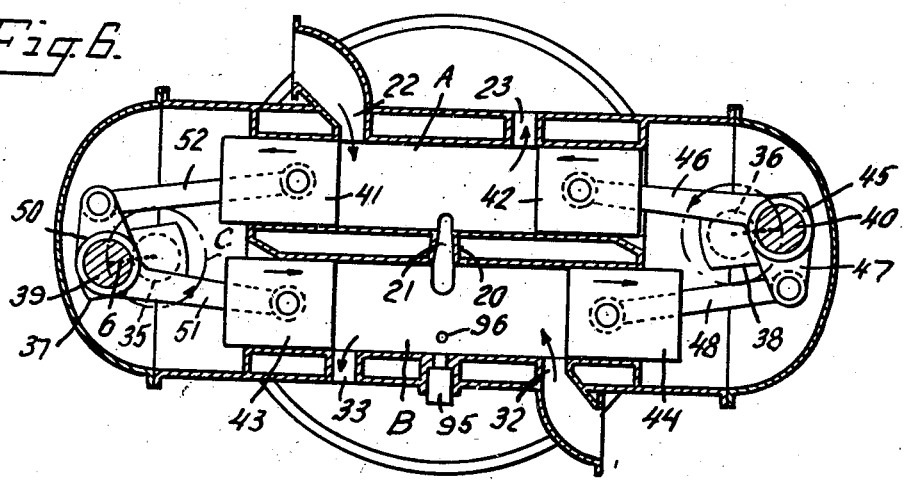
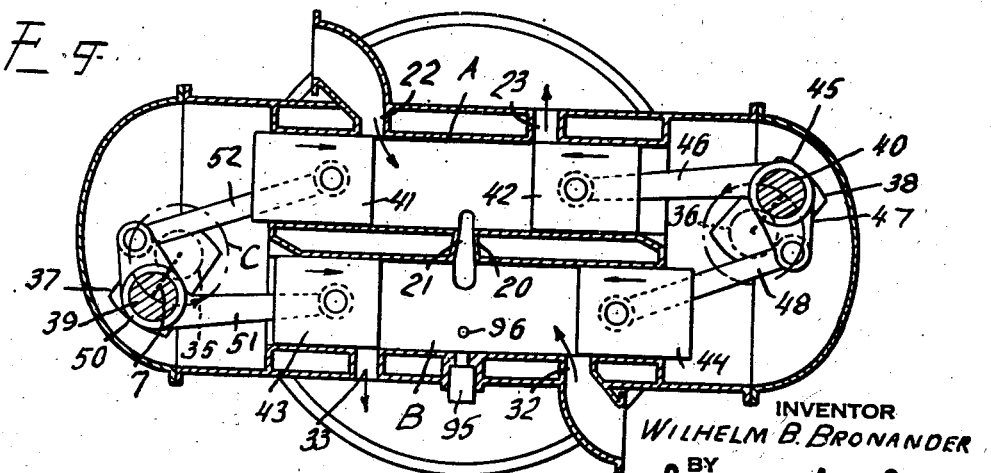
INVENTOR
WILHELM B. BRONANDER
BY
ATTORNEY Patented Apr. 29, 1947

2,419,531

UNITED STATES PATENT OFFICE 2,419,531

MULTIPLE OPPOSED PISTON ENGINE

Wilhelm B. Bronander, Montclair, N. J.

Application January 23, 1945, Serial No. 574,191

21 Claims. (Cl. 123—51)

This invention relates to a method of and apparatus for generating power.

More particularly stated, the invention has been worked out in connection with an internal combustion engine of the opposed piston, two stroke cycle type, in which the cylinder ports are piston controlled and the incoming charge under pressure is admitted to the cylinder. Although somewhat similar in its structural features to the engine illustrated in my prior Patent No. 1,614,867, the power generator hereinafter described differs materially therefrom in operation and in the method of generating power.

This invention has for its main object to produce a power generating unit consisting of a pair of substantially parallel, centrally communicating cylinder units having opposed port controlling pistons in each cylinder so constructed and operated that during the compression stroke the air in one cylinder is forced by the oppositely moving pistons through a narrow centrally located expanding slot into the communicating cylinder.

By transferring the air from one cylinder through the narrow expanding slot at high velocity a very high turbulence in the expanding air is set up, against which the fuel is injected, assuring a thorough break up of the fuel, thus preventing fuel condensation on the cylinder walls, also reducing the cylinder combustion space area to a minimum. This is especially important when alcohol is used for fuel.

Another object of the invention is to produce a power generating unit so constructed and arranged as to promote turbulence in the fuel injected and to prevent the fuel from striking the cool cylinder walls and condensing.

Another object of the invention is to provide a power generator so constructed and arranged that compressed air will be forced into the combustion chamber at high velocity and will be heated to a high temperature during its admission to the combustion chamber.

Another object of the invention is to provide a unit of the character described, so constructed and arranged that the combustion chamber will have a minimum volume for the power generated.

Another object of the invention is to provide a power generating unit so constructed and arranged as to require a minimum number of parts.

Another object of the invention is to provide a power generator of the character described so constructed and arranged that the intake controlling piston stroke has approximately twice the capacity of the power stroke.

Further objects of the invention will appear from the following specification taken in connection with the drawings which form a part of this application, and in which Fig. 1 is a longitudinal sectional elevation, taken substantially on line 1—1 of Fig. 2, looking in the direction of the arrows, of a generator constructed in accordance with the invention and adapted for carrying out the method of generating power;

Fig. 2 is a sectional elevation taken substantially on line 2—2 of Fig. 1, looking in the direction of the arrows;

Fig. 3 is a transverse sectional elevation taken substantially on line 3—3 of Fig. 1, looking in the direction of the arrows;

Figs. 4, 5, 6 and 7 are sectional elevations similar to Fig. 1 but illustrating different positions of the pistons in the cycle of operation of the generator;

Fig. 8 is a top plan view of the generator shown in Fig. 2; and

Fig. 9 is a diagrammatic view illustrating the cycle of operation of the generator unit.

The method of generating power consists briefly of providing two substantially parallel, centrally communicating opposed piston cylinders having differentially operated, port controlling pistons, the cylinders and pistons being so arranged and so operated that air enters the cylinders under pressure and is thereafter forced from one of the cylinders into the communicating cylinder in the path of fuel which is injected into the second cylinder. The incoming fuel therefore strikes the blast of compressed air, which prevents the fuel from stroking the cool cylinder wall and condensing. Moreover, turbulence is promoted, thereby giving an efficient mixture of fuel and air and promoting more complete combustion thereof. The combustion charge is fired in the second cylinder or in the cylinder in which the fuel is injected and the burning and expanding gases pass through the intercommunicating passage between the cylinders, thus producing power in both cylinders. Since the charge is fired in a combustion chamber of only one of the two power cylinders, the volume of the combustion chamber is reduced to a minimum.

In the particular generating unit hereinafter described, the ports are so located and so controlled by the pistons that the capacity of the charging stroke is almost twice as great as the power stroke. The unit is, furthermore, so constructed and arranged that the exhaust gases drive a turbine which drives the air compressor and is also geared to the engine shaft whereby the turbine acts as a booster.

Further details of the invention will appear from the following description.

In the particular apparatus illustrated in the drawings there is shown a power generator comprising two sets of substantially parallel cylinders A, B, A' and B'. It should be understood that the invention is not limited to any particular number of cylinders and that as many as desired may be utilized.

The cylinders A and B and A' and B' are separated by a wall 20 but the cylinders of each set communicate with each other through centrally disposed narrow passages 21 which, as illustrated, are flared outwardly on the cylinder A to the cylinder B or from A' to B'.

Since both sets of cylinders are exactly alike further reference thereto will be limited to cylinders A and B, it being understood that the description applies equally well to all other sets of the unit.

Cylinder A is provided with an inlet port 22 and an exhaust port 23. Cylinder B is provided with an inlet port 32 and an exhaust port 33. It should be noted that the inlet port 22 is disposed substantially opposite the exhaust port 33 but this statement does not apply to the positions of the inlet and exhaust ports 32 and 23 since the port 32 is spaced farther away from the port 33 than the corresponding ports in the cylinder A. Thus cylinder B has a greater capacity than cylinder A.

The generator has a pair of crank shafts 35 and 36 which are connected by cranks 37 and 38 to crank pins 39 and 40.

Opposed pistons 41 and 42 are provided in the cylinder A and oppositely acting pistons 43 and 44 are mounted in the cylinder B. An L-shaped connecting rod is mounted at 45 on the crank pin 40 and has one arm 46 pivotally connected to the piston 42 and its other arm 47 connected by a connecting rod 48 to the piston 44.

A similar connecting rod is mounted at 50 on the crank pin 39 and has one end 51 connected to the piston 43 and its opposite end pivoted to a connecting rod 52 which is connected to the piston 41.

The exhaust ports 23 and 33 communicate with exhaust manifolds 55 and 56, which in turn communicate with a turbine casing 57 in which is mounted a turbine wheel 58 mounted on a shaft 59 which in turn is mounted in suitable bearings in a casing 60. The turbine wheel is driven by the exhaust gases and the turbine shaft 59 drives an air compressor or blower 65. The blower forces air under pressure through intake manifolds 66 and 67 to the intake ports 22 and 32.

The crank shafts 35 and 36 have mounted thereon bevel gears 70 and 71 which mesh with gears 72 and 73 mounted on shafts 74 and 75. At the other end of these shafts are mounted gears 76 and 77 which mesh with gears 80 and 81. Gear 80 is pinned to a shaft 82 which may be a propeller shaft and gear 81 is pinned to a sleeve 83 which may be connected to drive a second propeller in the opposite direction to the drive of the shaft 82.

The turbine 58, in addition to furnishing power for driving the air compressor, also acts as a booster for the shafts 35 and 36. The turbine shaft 65 has secured to the inner end thereof a gear 85 which meshes with gears 86 and 87 mounted respectively on idler shafts 88 and 89 on which are also mounted gears 90 and 91. The latter gears mesh with gears 92 and 93 mounted respectively on the shafts 35 and 36. Thus power is transmitted from the turbine shaft to the power generator shafts 35 and 36.

The power generator above described operates in the following manner, attention being particularly directed to Figs. 1, 4, 5, 6, 7 and 9.

In Fig. 1 the pistons 41 and 42 are disposed substantially at the inner extreme positions of movement thereof. The scavenging air from the blower 65 has entered the cylinder A and from the cylinder A has been forced into the cylinder B between the pistons 43 and 44. Cylinder B has already received air through intake port 32. The air for cylinder A has been forced through the passage 21 at high velocity and has become heated thereby and enters the cylinder B directly in the path of the fuel which is injected into said cylinder B, as shown at 95. This incoming air under high pressure and at high velocity promotes turbulence in the combustion space between the cylinders 43 and 44 and effectively prevents the fuel injected into the cylinder B from striking the cylinder walls and becoming cooled thereby and condensing on the cylinder wall.

Fig. 1, therefore, illustrates the positions of the cylinders and shafts at the end of the compression stroke during which the air has been forced from the cylinder A into the cylinder B and the fuel has been injected into the cylinder B. This fuel injection may take place at any desired time in the cycle of operation of the power generator. If gasoline is used for fuel the fuel injection takes place earlier than with a heavier fuel injected for a Diesel cycle. If desired, the fuel injection can continue substantially throughout the charging stroke with spark ignition.

The cylinder B is provided with suitable ignition means, such as a spark plug 96, by means of which the fuel is ignited. Upon ignition of the fuel the combustion gases pass from the cylinder B into the cylinder A, thus furnishing a power stroke in both cylinders. This continues until approximately the position illustrated in Fig. 4 in which the exhaust ports 23 and 33 are about to open. As the pistons 42 and 44 move from the positions illustrated in Fig. 4 to the positions illustrated in Fig. 5, the exhaust ports 23 and 33 are uncovered and the exhaust gases pass through the exhaust manifolds 55 and 56 to the turbine casing 57, thus driving the turbine wheel 58 which, as before stated, furnishes power for the compressor 65 and also through the trains of gearing acts as a booster for the generator shafts 35 and 36. Attention is called to the fact that in Fig. 4 the pistons 41 and 44 are still a considerable distance from their outer limits of travel where the intake ports will be opened. Thus, there is still a relatively large volume of expanding gases in the cylinders which pass through the exhaust ports to drive the turbine.

Fig. 5 shows the pistons 41 and 44 about to open the intake ports 22 and 32 to admit the compressed air. This position is at the end of the power stroke and the combustion gases are passing through the exhaust ports 23 and 33 to the turbine, thus driving the turbine. The compressed air, when admitted, will scavenge the cylinders A and B and the air will pass through the exhaust manifolds 55 and 56 to the turbine casing and thus cool the turbine. This action is taking place in the position of the pistons illustrated in Fig. 6. It will be noted that the exhaust ports in Fig. 4 open materially in advance of the intake port opening shown in Fig. 5. With the turbine drive illustrated this advance is approximately 50° but with the generator operating as a Diesel engine the degree of advance of the exhaust opening over the intake would be considerably less.

In Fig. 7 the intake ports 22 and 32 are nearly closed by the pistons 41 and 44 and the exhaust ports 23 and 33 have been entirely closed by the pistons 42 and 43. During this stroke the air under compression which is being admitted to the two cylinders A and B will be compressed as the pistons move from the position shown in Fig. 7 to the position shown in Fig. 1. The air charge in cylinder A will be compressed and will be forced from the cylinder A through the narrow passage 21 to the cylinder B during the movement of the pistons 41 and 42 toward each other and, as above explained, this air at high velocity and under high pressure will meet the incoming fuel injection charge, thus breaking up the fuel and thoroughly intermixing the air and fuel, whereby the fuel mixture can be efficiently ignited by the ignition means or spark plug 96.

From the showing in Fig. 1 it will be seen that the air from cylinder A has been forced by pistons 41 and 42 through the passage 21 into the cylinder B and into the space between the pistons 43 and 44, which forms the combustion chamber. It will be noted that the combustion chamber between the pistons 43 and 44 will have a minimum volume for the amount of power generated in the two cylinders.

In Figs. 1, 4, 5, 6 and 7, a circle C has been drawn to indicate the path of travel of the crank pin 39 around the axis of the crank shaft 35. Moreover, in these figures dotted lines have been drawn through the center of the crank shaft and center of the crank pin to clearly indicate the arcuate position of the crank pin for the various stages in the cycle illustrated in these figures.

Furthermore, Fig. 9 has indicated thereon in one view the positions of the crank pin at the left hand side of Figs. 1, 4, 5, 6 and 7. In this figure the reference characters 1, 4, 5, 6 and 7, in alinement with the radii, designate the crank pin positions in the corresponding figures of the drawings. In the figure referred to, the line 1 which indicates the position shown in Fig. 1 shows the angular position of the crank shaft 35 just past the inner dead center position or the position in which the pistons are disposed in their innermost positions of movement. The line designated 4 shows the position of the pistons in Fig. 4 in which pistons 42 and 43 are about to move outwardly to open the exhaust ports 23 and 33. The line designated 5 shows the angular position of the crank shaft and corresponds to Fig. 5 in which the pistons 41 and 44 are about to open the inlet ports 22 and 32. The line designated 6 corresponds to Fig. 6 in which the inlet and exhaust ports are open, thus causing the compressed air which enters through the ports 22 and 32 to scavenge the engine and cool the turbine. The line indicated 7 shows the angular position of the crank shaft at the point where the exhaust ports 23 and 33 have been closed. The line designated 8 shows the angular position of the crank shaft at the period in the cycle in which the inlet ports 22 and 32 have been closed by the pistons 41 and 44. Attention is particularly called to the fact that the lines 8 and 1 in the direction of the arrow in Fig. 9 are separated by a wide arc, thus showing the relatively long stroke for the compression stroke of the engine. It will be noted that the compression stroke is much longer than the working stroke which is disposed between the lines 1 and 4.

Although one specific embodiment of a power generator and of the method of generating power have been particularly shown and described, it should be understood that the invention is capable of modification and that changes in the particular construction and arrangement of parts and in the particular method described may be made without departing from the spirit or scope of the invention, as expressed in the following claims.

What I claim is:

1. A method of generating power which consists of providing two centrally intercommunicating opposed piston cylinders, forcing compressed air from one cylinder to the other, thereby adding to the charge in said other cylinder and creating turbulence therein, admitting fuel to the second cylinder, firing the charge in said second cylinder, and operating both cylinders by the expanding gases of combustion in both cylinders.

2. A method of generating power which consists of forcing air under pressure from one of two intercommunicating, opposed piston cylinders into the other cylinder in the path of fuel admitted to the second cylinder, thereby adding to the charge in said second cylinder and creating turbulence therein, firing the charge in the second cylinder, operating both cylinders by the expanding gases of combustion in both cylinders.

3. A method of generating power which consists of providing two intercommunicating, opposed piston cylinders, forcing compressed air from one cylinder to the other, thereby adding to the charge in said other cylinder, admitting fuel to the second cylinder in line with the incoming air whereby turbulence is promoted, firing the charge in said second cylinder, and operating both cylinders by the expanding gases of combustion in both cylinders.

4. The method of operating the type of power unit consisting of a pair of substantially parallel centrally communicating cylinder units, each cylinder having intake and exhaust ports and having differentially operating, opposed port controlling pistons, which comprises compressing and transferring the compressed charge from one cylinder to the communicating cylinder through a narrow centrally located slot, thereby adding to the charge in said communicating cylinder, during said transfer injecting the fuel into the communicating cylinder against and into the turbulent path of the expanding air, igniting the combustible mixture, expanding the gases in both cylinders, and differentially opening and closing the ports, thereby exhaust scavenging and supercharging the cylinders for a succeeding cycle.

5. The method of operating the type of power unit consisting of a pair of substantially parallel centrally communicating cylinder units, each cylinder having intake and exhaust ports and having differentially operating, opposed, port controlling pistons, which comprises compressing and transferring the air charge from one cylinder to the communicating cylinder through a narrow centrally located slot, thereby adding to the charge in said communicating cylinder, during said air transfer injecting the fuel into the communicating cylinder against and into the turbulent path of the expanding air, igniting the combustible mixture by firing the charge in one cylinder, expanding the gases in both cylinders, and differentially opening and closing the ports, thereby exhaust scavenging and supercharging the cylinders for a succeeding cycle.

6. The method of operating the type of power unit consisting of a pair of substantially parallel centrally communicating cylinder units, each cylinder having intake and exhaust ports and having differentially operating, opposed, port controlling pistons, and a gas turbine connected to the exhaust ports of said cylinders, which comprises compressing and transferring the air charge from one cylinder to the communicating cylinder through a narrow centrally located slot, thereby adding to the charge in said communicating cylinder, during said air transfer injecting the fuel into the communicating cylinder against and into the turbulent path of the expanding air, igniting the combustible mixture, expanding the gases in both cylinders, and differentially opening and closing the ports, thereby exhaust scavenging and supercharging the cylinders for a succeeding cycle, said exhaust ports being opened to pass the expanding gases to the turbine materially ahead of the intake opening.

7. The method of operating the type of power unit consisting of a pair of substantially parallel centrally communicating cylinder units, each cylinder having intake and exhaust ports and having differentially operating, opposed, port controlling pistons, and a gas turbine connected to the exhaust ports of said cylinders, which comprises compressing and transferring the air charge from one cylinder to the communicating cylinder through a narrow centrally located slot, thereby adding to the charge in said communicating cylinder, during said air transfer injecting the fuel into the communicating cylinder against and into the turbulent path of the expanding air, igniting the combustible mixture, expanding the gases in both cylinders, and differentially opening and closing the ports, thereby exhaust scavenging and supercharging the cylinders for a succeeding cycle, said exhaust ports being opened to pass the expanding gases to the turbine materially ahead of the intake opening.

8. In a power generating unit, a pair of cylinders of different volumetric capacity, each having oppositely acting pistons therein and each having an intake and an exhaust port controlled by said pistons, a turbine, said cylinders being connected by a passage disposed intermediate the ends thereof, a crank shaft at each end of said pair of cylinders, and connecting rods between said shafts and said pistons for controlling the opening and closing of the ports and arranged to cause discharge of the expanded gases to the turbine materially ahead of the intake opening.

9. A power generating unit of the two stroke cycle, opposed piston type comprising a pair of parallel cylinders, each having an intake and an exhaust port and having a pair of opposed pistons therein, a turbine, means for conducting exhaust gases from said exhaust ports to said turbine, a pair of crank shafts, one disposed at each end of the cylinders, and connections from said shafts to said pistons arranged to cause discharge of the expanding gases from the cylinders to said turbine materially ahead of the intake opening.

10. In a power generating unit, a pair of substantially parallel cylinders, each cylinder having opposed pistons therein, said unit having a passage establishing communication between said cylinders midway between the ends thereof, said passage constituting means for admitting air under compression and from one cylinder to the other cylinder thereby adding to the charge in said other cylinder, and means for admitting fuel to said second cylinder at a point opposite the compressed air inlet passage whereby the fuel is prevented from striking the cool cylinder walls and turbulence is promoted.

11. A method of operating a power generator of the type having centrally intercommunicating substantially parallel cylinders, each having intake and exhaust piston controlled ports, one cylinder having a greater volumetric capacity than the other cylinder, forcing air from the cylinder of smaller capacity to the cylinder of larger capacity, thereby adding to the charge in said cylinder of larger capacity, firing the charge and operating both cylinders by the expanding gases of combustion in both cylinders.

12. A method of operating a power generator of the type having two centrally intercommunicating, opposed, piston cylinders, one cylinder having a greater volumetric capacity than the other, forcing air from the cylinder of smaller capacity to the cylinder of larger capacity, thereby adding to the charge in said cylinder of larger capacity, firing the charge and operating both cylinders by the expanding gases of combustion in both cylinders.

13. A method of generating power which consists of providing two centrally intercommunicating, opposed, piston cylinders of different length and volumetric capacity, forcing air from the smaller cylinder to the larger cylinder, thereby adding to the charge in said larger cylinder, admitting fuel to the larger cylinder, firing the charge and operating both cylinders by the expanding gases of combustion in both cylinders.

14. A method of generating power which consists of providing two centrally communicating, opposed piston cylinders of different volumetric capacity, forcing air from one cylinder to the other, admitting fuel to one cylinder, firing the charge, and operating the pistons in both cylinders by the expanding gases of combustion in both cylinders.

15. A method of generating power which consists of providing two centrally communicating, opposed piston cylinders of different volumetric capacity, forcing air from one cylinder to the other, admitting fuel to the second cylinder in the path of said air, firing the charge, and operating the pistons in both cylinders by the expanding gases of combustion in both cylinders.

16. A method of generating power which consists of providing two centrally communicating, opposed, piston cylinders, forcing a compressed charge from one cylinder to the other, thereby adding to the charge in said other cylinder and creating turbulence therein, firing the charge in the second cylinder, and operating both cylinders by the expanding gases of combustion in both cylinders.

17. A method of generating power which consists of forcing fluid under pressure from one of two intercommunicating, opposed, piston cylinders into the other cylinder, thereby adding to the charge in said other cylinder and creating turbulence therein, firing the charge, and operating both cylinders by the expanding gases of combustion in both cylinders.

18. A method of geenrating power which consists of providing two centrally communicating, opposed, piston cylinders of different volumetric capacity, forcing fluid from one cylinder to the other, thereby adding to the charge in said other cylinder and creating turbulence therein, firing the charge, and operating both cylinders by the expanding gases of combustion in both cylinders.

19. A method of operating a power generator of the type having a pair of substantially parallel intercommunicating cylinders and a pair of opposed pistons in each cylinder, each cylinder having an intake and an exhaust port, forcing a charge from one cylinder to the other, thereby adding to the charge in said other cylinder and creating turbulence therein, firing the charge, and operating the pistons in both cylinders by the expanding gases of combustion in both cylinders, said pistons being so operated as to open the exhaust ports of the cylinders materially ahead of the intake port openings.

20. A method of operating a power generator of the type having a pair of substantially parallel intercommunicating cylinders and a pair of opposed pistons in each cylinder, each cylinder having an intake and an exhaust port, forcing a charge from one cylinder to the other, thereby adding to the charge in said other cylinder and creating turbulence therein, firing the charge, and operating the pistons in both cylinders by the expanding gases of combustion in both cylinders, said pistons being so operated as to close the exhaust ports of the cylinders materially ahead of the intake port openings.

21. A method of generating power which consists of providing two intercommunicating, opposed, piston cylinders, forcing a compressed charge from one cylinder to the other, thereby adding to the charge in said other cylinder and creating turbulence therein, firing the charge, operating both cylinders by the expanding gases of combustion in both cylinders, and initiating the discharge of the exhaust gases from said cylinders materially ahead of the admission of intake charge.

WILHELM B. BRONANDER.

REFERENCES CITED

The following references are of record in the file of this patent:

UNITED STATES PATENTS

| Number | Name | Date |
|---|---|---|
| 2,295,120 | Maw | Sept. 8, 1942 |
| 1,432,320 | Bronander | Oct. 17, 1922 |
| 1,460,475 | Bronander | July 3, 1923 |
| 1,591,275 | Bronander | July 6, 1926 |
| 1,614,867 | Bronander | Jan. 18, 1927 |
| 1,914,793 | Szydlowski | June 20, 1933 |
| 1,206,722 | McKechnie | Nov. 28, 1916 |